United States Patent
Noguchi

(10) Patent No.: US 11,772,427 B2
(45) Date of Patent: Oct. 3, 2023

(54) MOTORCYCLE TIRE

(71) Applicant: Sumitomo Rubber Industries, Ltd., Kobe (JP)

(72) Inventor: Yoshihisa Noguchi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 17/569,064

(22) Filed: Jan. 5, 2022

(65) Prior Publication Data
US 2022/0258537 A1 Aug. 18, 2022

(30) Foreign Application Priority Data
Feb. 15, 2021 (JP) .................................. 2021-021885

(51) Int. Cl.
| | |
|---|---|
| *B60C 9/07* | (2006.01) |
| *B60C 9/22* | (2006.01) |
| *B60C 9/20* | (2006.01) |

(52) U.S. Cl.
CPC ........ B60C 9/22 (2013.01); *B60C 2009/2016* (2013.01); *B60C 2009/2019* (2013.01); *B60C 2009/2022* (2013.01); *B60C 2200/10* (2013.01)

(58) Field of Classification Search
CPC .............. B60C 9/07; B60C 2009/2022; B60C 2009/2025; B60C 2009/2032
See application file for complete search history.

(56) References Cited

U.S. PATENT DOCUMENTS

| | | | | |
|---|---|---|---|---|
| 3,982,579 A | * | 9/1976 | Mirtain ................... | B60C 11/01 152/209.16 |
| 6,318,429 B1 | * | 11/2001 | Corner ..................... | B60C 9/09 152/526 |
| 8,011,404 B2 | | 9/2011 | Ishiyama et al. | |

(Continued)

FOREIGN PATENT DOCUMENTS

| | | | |
|---|---|---|---|
| DE | 10122812 | * | 11/2002 |
| EP | 1632335 | * | 3/2006 |

(Continued)

OTHER PUBLICATIONS

Extended European Search Report for corresponding European Application No. 22153390.4, dated Jun. 17, 2022.

*Primary Examiner* — Justin R Fischer
(74) *Attorney, Agent, or Firm* — Birch, Stewart, Kolasch & Birch, LLP

(57) ABSTRACT

A motorcycle tire includes a tread portion, a pair of sidewall portions, a pair of bead portions, a toroidal carcass extending between the pair of bead portions, and a belt layer and a band layer disposed outwardly in the tire radial direction of the carcass in the tread portion. The carcass includes a plurality of carcass cords. The band layer includes a jointless band ply having a band cord wound spirally at an angle equal to or less than 5 degrees with respect to a tire circumferential direction. The belt layer includes a plurality of belt cords arranged in a direction intersecting with the carcass cords. The belt cords intersect with the carcass cords at an intersection angle $\theta c$ in a tread crown region, and intersect with the carcass cords at an intersection angle $\theta s$ in tread shoulder regions, and the intersection angle $\theta c$ is greater than the intersection angle $\theta s$.

11 Claims, 2 Drawing Sheets

(56) References Cited

U.S. PATENT DOCUMENTS

| | | | |
|---|---|---|---|
| 2006/0225824 A1* | 10/2006 | Kuwajima | B60C 9/22 |
| | | | 152/531 |
| 2015/0000817 A1* | 1/2015 | Oshima | B60C 9/06 |
| | | | 152/531 |
| 2015/0210120 A1 | 7/2015 | Matsunami | |
| 2016/0318344 A1* | 11/2016 | Doi | B29D 30/72 |

FOREIGN PATENT DOCUMENTS

| | | | |
|---|---|---|---|
| JP | 6-286417 | * | 10/1994 |
| JP | 3158056 | * | 9/1996 |
| JP | 5179803 | B2 | 4/2013 |
| JP | 2013-141884 | * | 7/2013 |
| JP | 2013-180703 | A | 9/2013 |
| JP | 6249520 | B2 | 12/2017 |
| WO | WO 2016/021568 | A1 | 2/2016 |

* cited by examiner

MOTORCYCLE TIRE

RELATED APPLICATIONS

This application claims the benefit of foreign priority to Japanese Patent Application No. JP2021-021885, filed Feb. 15, 2021, which is incorporated by reference in its entirety.

FIELD OF THE INVENTION

The present disclosure relates to a motorcycle tire.

BACKGROUND OF THE INVENTION

Patent Document 1 below describes a motorcycle tire that includes a carcass layer, a belt layer, and a belt reinforcing layer arranged in the tread portion. In the motorcycle tire, cord angles of the cords forming the carcass, the cords forming the belt layer, and the organic fiber cords forming the belt reinforcing layer are specified. In Patent Document 1, it is explained that the motorcycle tire exhibits excellent steering stability at turning.

PATENT DOCUMENT

[Patent Document 1] Japanese Patent 5179803

SUMMARY OF THE INVENTION

In recent years, it has been desired to further improve steering stability of motorcycle tires when turning, especially when turning at high speeds of 70 km/h or more.

The present disclosure has been made in view of the above circumstances and has a major object to provide a motorcycle tire capable of improving steering stability when turning, especially when high-speed turning.

In one aspect of the present disclosure, a motorcycle tire includes a tread portion, a pair of sidewall portions, a pair of bead portions, a toroidal carcass extending between the pair of bead portions, and a belt layer and a band layer disposed outwardly in the tire radial direction of the carcass in the tread portion. The carcass includes a plurality of carcass cords, the band layer includes a jointless band ply having a band cord wound spirally at an angle equal to or less than 5 degrees with respect to a tire circumferential direction, the belt layer includes a plurality of belt cords arranged in a direction intersecting with the carcass cords, the belt cords intersect with the carcass cords at an intersection angle θc in a tread crown region, and intersect with the carcass cords at an intersection angle θs in a pair of tread shoulder regions, and the intersection angle θc is greater than the intersection angle θs.

DETAILED DESCRIPTION OF THE INVENTION

Figure 1:
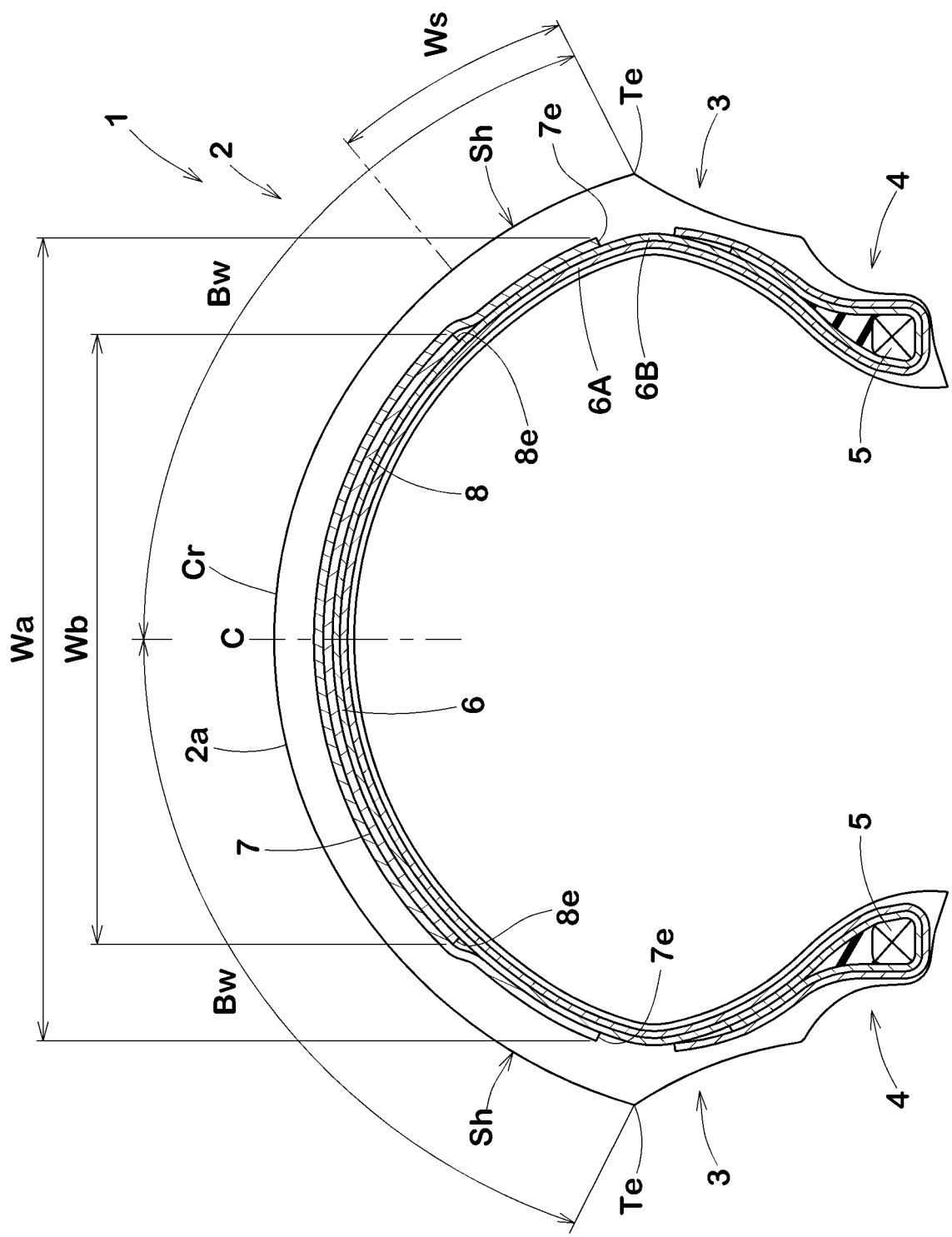
FIG. 1 is a cross-sectional view of a motorcycle tire of an embodiment in accordance with the present disclosure.

Hereinafter, an embodiment of the present disclosure will be described with reference to the drawings. FIG. 1 is a cross-sectional view including the tire axis of a motorcycle tire 1 (hereafter, simply referred to as "tire") under a normal state in accordance with the present embodiment. The tire 1 according to the present embodiment is suitably used for on-road driving such as on a dry asphalt road surface. However, the tire 1 according to the present disclosure is not limited to such an embodiment.

As used herein, "normal state" is such that the tire 1 is mounted onto a standard Wheel rim (not illustrated) with a standard pressure but loaded with no tire load. Unless otherwise noted, dimensions of portions of the tire 1 are values measured under the normal state.

As used herein, "standard Wheel rim" is a Wheel rim officially approved for each tire by standards organizations on which the fire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tire 1 according to the present embodiment includes a tread portion 2, a pair of sidewall portions 3, and a pair of bead portions 4. The tire 1 has an outer surface 2a of the tread portion 2 which is curved in an arc-shape manner protruding outwardly in the tire radial direction.

In the present embodiment, the tread portion 2 includes a tread crown region Cr including the tire equator C, and a pair of tread shoulder regions Sh positioned both sides of the tread crown region Cr. The tread crown region Cr extends to both sides in the tire axial direction with the tire equator C as the center, for example. The tread shoulder regions Sh have a width Ws equal to or more than 30% of a tread development half-width Bw from respective tread edges Te. The width Ws of the tread shoulder regions Sh is equal to or less than 40% of the tread development half-width Bw, for example, from the respective tread edges Te to the inside of the tire axial direction. As used herein, "tread development half-width" is the length of 0.5 times of the length of the tire axial direction between the tread edges Te and Te when the tread portion 2 is developed on a plane.

The pair of sidewall portions 3 is connected to a pair of ends in the tire axial direction of the tread portion 2 and extends inwardly in the tire radial direction. The pair of bead portions 4, for example, is connected to the pair of sidewall portions 3 and extends inwardly in the tire radial direction. Each bead portion 4 includes a bead core 5 therein.

The tire 1 according to the present embodiment includes a toroidal carcass 6 extending between the pair of head portions 4, and a belt layer 7 and a band layer 8 disposed outwardly in the tire radial direction of the carcass 6 in the tread portion 2.

Figure 2:
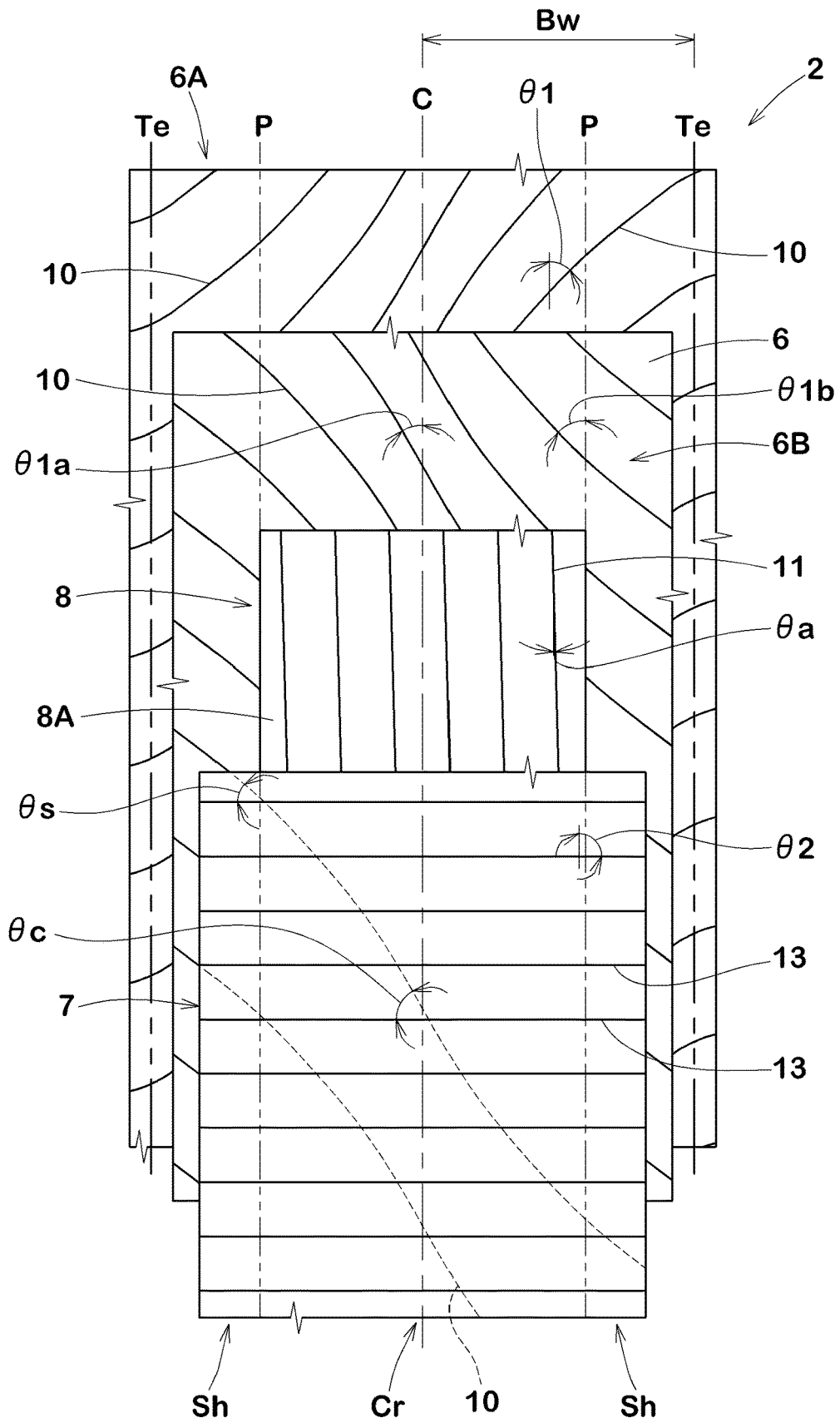
FIG. 2 is a development view of an inside of a tread portion shown in FIG. 1.

FIG. 2 illustrates a development view of an inside of the tread portion 2. As illustrated in FIG. 2, the carcass 6 includes a plurality of carcass cords 10. In addition, the band layer 7 includes a jointless band ply 8A having a hand cord 11 wound spirally at an angle θa equal to or less than 5 degrees with respect to the tire circumferential direction. Such a band layer 8 can suppresses the expansion of tire outer diameter and enhance high-speed stability when straight-ahead driving. The belt layer 7 includes a plurality of belt cords 13 arranged in a direction intersecting with the carcass cords 10.

In addition, the belt cords 13 intersect with the carcass cords 10 at an intersection angle θc in the tread crown region Cr, and intersect with the carcass cords 10 at an intersection angle θs in the pair of tread shoulder regions Sh. The intersection angle θc is greater than the intersection angle θs. With this, a large hoop effect can be obtained in the tread shoulder regions Sh, increasing the shear rigidity thereof so as to withstand a large centrifugal force. Thus, the tire 1 according to the present embodiment can exhibit excellent steering stability when high-speed turning. Further, in the tread crown region Cr, the intersection angle θc is relatively large, shear rigidity thereof does not become excessively high, and riding comfort and high-speed stability when straight running can be maintained.

Preferably, the intersection angle θc and the intersection angle θs are in a range of 20 to 65 degrees. If the intersection angle θc and the intersection angle θs are equal to or less than 65 degrees, hoop effect can be obtained, and stability can be ensured in straight running and turning. When the intersection angle θc and the intersection angle θs are less than 20 degrees, the hoop effect may not be obtained. From this point of view, the intersection angle θc and the intersection angle θs are preferably equal to or more than 25 degrees, more preferably equal to or more than 30 degrees, but preferably equal to or less than 60 degrees, more preferably equal to or less than 55 degrees.

The difference (θc−θs) between the intersection angle θc and the intersection angle θs is preferably in a range of 3 to 20 degrees. When the difference (θc−θs) is equal to or more than 3 degrees, running stability when straight running and turning can improve. When the difference (θc−θs) is equal to or less than 20 degrees, the difference in shear rigidity between the tread crown region Cr and the tread shoulder regions Sh can be smaller, and thus the handling operations from straight running to turning and from turning to straight running can be smooth, improving the stability. In view of the above, the difference (θc−θs) is more preferably equal to or more than 5 degrees, and more preferably equal to or less than 15 degrees.

In the present embodiment, the intersection angle θc is the angle on the tire equator C. In addition, the intersection angle θs is the angle on the positions P located inwardly in the tire axial direction by a distance of 30% of the tread development half-width Bw from the respective tread edges Te. Further, when the carcass 6 or the belt layer 7 includes a plurality of plies, the intersection angles θc and θs are specified using carcass cords of the carcass ply located outermost in the tire radial direction and belt cords of the belt ply located innermost in the tire radial direction.

The carcass 6, for example, includes at least one carcass ply of the carcass cords 10 which are coated with a topping rubber. The carcass 6, in the present embodiment, includes two carcass plies 6A and 6B which are superimposed in the tire radial direction. The carcass plies 6A and 6B, for example, extend between the pair of bead cores 5 such that axially both ends of the plies are turned up around the bead cores (shown in FIG. 1).

The carcass plies 6A and 6B, in the present embodiment, are superimposed in the tire radial direction such that the carcass cords 10 thereof cross with each other. The carcass cords 10, for example, are made of an organic fiber cord.

In the carcass cords 10 according to the present embodiment, an angle θ1 with respect to the tire circumferential direction increases from the tire equator C toward the both tread edges Te sides, Such carcass cords 10 can increase rigidity in the tire axial direction on the tread edges Te side and increase rigidity in the tire circumferential direction on the tire equator C side. Preferably, the angle θ1 of the carcass cords 10, for example, increase continuously over the entire region from the tire equator C to the both tread edges Te side.

Preferably, an angle θ1a of the carcass cords 10 with respect to the tire circumferential direction, for example, is in a range of 25 to 70 degrees. Here, the angle θ1a is an angle in the tread crown region Cr, more specifically an angle at the tire equator C. By setting the angle θ1a in a range of 25 to 70 degrees, the carcass plies 6A and 6B can also exert hoop effect. The angle θ1a is preferably equal to or more than 30 degrees, and equal to or less than 65 degrees.

An angle θ1b of the carcass cords 10 with respect to the tire circumferential direction in the tread shoulder regions Sh, more specifically at the position P, is preferably equal to or more than 35 degrees, more preferably equal to or more than 40 degrees, but preferably equal to or less than 80 degrees, more preferably 75 degrees. With this, the above-mentioned advantages can be exerted effectively.

As illustrated in FIG. 1, outermost edges Se in the tire axial direction of the band layer 8, for example, are located inwardly in the tire axial direction with respect to outermost edges 7e in the tire axial direction of the belt layer 7. In addition, the band layer 8 according to the present embodiment is disposed inward in the tire radial direction of the belt layer 7. In other words, the band layer 8, in the present embodiment, is sandwiched between the carcass 6 and the belt layer 7. With this, the impact transmitted to a handle of the motorcycle when the camber angle changes and one of the outermost edges Se in the tire axial direction of the band layer 8 comes into contact with the ground can be absorbed by the belt layer 7. This can further improve steering stability when high-speed turning.

Preferably, a width Wb in the tire axial direction of the band layer 8 is in a range of 0.5 to 0.9 times of a width Wa in the tire axial direction of the belt layer 7. When the width Wb of the band layer 8 is equal to or more than 0.5 times of the width Wa of the belt layer 7, high-speed stability when straight-ahead driving can be improved. When the width Wb of the band layer 8 is equal to or less than 0.9 times of the width Wa of the belt layer 7, steering stability when high-speed turning can be improved.

It is preferable that the outermost edges 7e in the tire axial direction of the belt layer 7 are located away from the tire equator C along the outer surface 2a of the tread portion 2 by a distance in a range of from 70% to 100% of the tread development half-width Bw in order to effectively exert the above-mentioned action.

As illustrated in FIG. 2, the belt cords 13 of the belt layer 7 extend straight. An angle θ2 of the belt cords 13 with respect to the tire circumferential direction, for example, may increase continuously from the tire equator C toward the tread edges Te side. The angle θ2 of the belt cords 13 with respect to the tire circumferential direction is preferably equal to or more than 85 degrees. This makes it possible to enhance rigidity in the tire axial direction of the tire 1. Further, the angle θ2 of the belt cords 13 is more preferably equal to or more than 88 degrees, still further preferably 90 degrees.

While the motorcycle tire according to an embodiment of the present disclosure has been described in detail above, the present disclosure is not limited to the above embodiment, and can be modified to various aspects.

WORKING EXAMPLE

Motorcycle tires with the basic structure of FIG. 1 were, prepared. Then, steering stability when high-speed turning, steering stability when low-speed turning (less than 70 km/h), and high-speed stability when straight running of each test tire were tested. The common specifications of each test tire and the test methods are as follows.
Test for steering stability when high-speed turning, steering stability when low-speed turning, and high-speed stability when straight running:

A test rider drove a test motorcycle equipped with test tires on a dry asphalt road test course. After driving, the test rider evaluated each test item sensually. Each item was evaluated using a 10-point method with a maximum of 10 points. The test results are shown in Table 1. The higher the value, the better each test item. Note that "position of 7e" in Table 1 means a ratio of a development length from the tire equator to the outermost edges of the belt layer to the tread development half-width.

Front tire (size, rim, internal pressure): 110/70-13M/C, 1.3×3.00MT, 200 kPa
Rear tire (size, rim, internal pressure): 130/70-13M/C, 13×3.50 MT, 220 kPa
Test vehicle: Motorcycle with a displacement of 1000 cc
Table 1 shows the test results.

TABLE 1

|  | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|
| θc (deg.) | 30 | 20 | 35 | 25 | 25 | 20 | 50 | 55 | 35 |
| θs (deg.) | 35 | 25 | 30 | 20 | 20 | 15 | 30 | 30 | 33 |
| θc-θs (deg.) | −5 | −5 | 5 | 5 | 5 | 5 | 20 | 25 | 2 |
| Wb/Wa | 0.8 | 0.8 | 0.8 | 0.7 | 0.7 | 0.8 | 0.8 | 0.8 | 0.8 |
| θ2 (deg.) | 90 | 90 | 90 | 90 | 90 | 90 | 90 | 90 | 90 |
| Position of 7e (%) | 90 | 90 | 90 | 90 | 70 | 90 | 90 | 90 | 90 |
| θ1a (deg.) | 65 | 65 | 55 | 65 | 65 | 65 | 65 | 65 | 65 |
| Steering stability when high-speed turning [Maximum 10 points] | 5 | 6 | 9 | 8 | 8 | 8 | 8 | 7.5 | 7.5 |
| Steering stability when low-speed turning [Maximum 10 points] | 6 | 5 | 9 | 8 | 7.5 | 7.5 | 8 | 7.5 | 7.5 |
| High-speed stability when straight running [Maximum 10 points] | 7 | 7 | 9 | 7.5 | 7.5 | 8 | 7.5 | 7.5 | 7.5 |

As a result of the test, it was confirmed that the tires of the examples exhibited excellent steering stability when high-speed turning. In addition to this, it was also continued that the tires of the examples had improved steering stability at low-speed driving and high-speed stability when straight-ahead driving.

ADDITIONAL NOTES

This disclosure includes the following contents.

Clause 1

A motorcycle tire comprising:
a tread portion;
a pair of sidewall portions;
a pair of bead portions;
a toroidal carcass extending between the pair of bead portions; and
a belt layer and a band layer disposed outwardly in the tire radial direction of the carcass in the tread portion;
wherein
the carcass comprises a plurality of carcass cords,
the band layer comprises a jointless band ply having a band cord wound spirally at an angle equal to or less than 5 degrees with respect to a tire circumferential direction,
the belt layer comprises a plurality of belt cords arranged in a direction intersecting with the carcass cords,
the belt cords intersect with the carcass cords at an intersection angle θc in a tread crown region, and intersect with the carcass cords at an intersection angle θs in a pair of tread shoulder regions, and
the intersection angle θc is greater than the intersection angle θs.

Clause 2

The motorcycle tire according to clause 1, wherein
the band layer is disposed inwardly in the tire radial direction of the belt layer.

Clause 3

The motorcycle tire according to clause 1 or 2, wherein
a width in the tire axial direction of the band layer is in a range of from 0.5 to 0.9 times of a width in the tire axial direction of the belt layer.

Clause 4

The motorcycle tire according to any one of clauses 1 to 3, wherein
the intersection angles θc and θs are in a range of 20 to 65 degrees.

Clause 5

The motorcycle tire according to any one of clauses 1 to 4, wherein
an angle of the belt cords with respect to the tire circumferential direction is equal to or more than 85 degrees.

Clause 6

The motorcycle tire according to any one of clauses 1 to 5, wherein
both ends in the tire axial direction of the belt layer are located away from a tire equator by a distance in a range of 70% to 100% of a tread development half-width.

Clause 7

The motorcycle tire according to any one of clauses 1 to 6, wherein an angle of the carcass cords with respect to the tire circumferential direction is in a range of 25 to 70 degrees.

Clause 8

The motorcycle tire according to any one of clauses 1 to 7, wherein
each of the pair of tread shoulder regions has a width equal to or more than 30% of a tread development half-width from respective tread edges.

The invention claimed is:

1. A motorcycle tire comprising:
a tread portion comprising a pair of tread edges, wherein the tread portion has a radially outer surface that is curved in an arc shape manner protruding outwardly in a tire radial direction and a tread width between the pair of tread edges that extends the tire's maximum axial width;
a pair of sidewall portions;
a pair of bead portions;
a toroidal carcass extending between the pair of bead portions; and
a belt layer and a band layer disposed outwardly in the tire radial direction of the carcass in the tread portion so as to extend axially across a center portion of the tire;
wherein
the carcass comprises a plurality of carcass cords,
the band layer comprises a jointless band ply having a band cord wound spirally at an angle equal to or less than 5 degrees with respect to a tire circumferential direction,
the belt layer consists of a single ply that comprises a plurality of belt cords arranged in a direction intersecting with the carcass cords,
the belt cords intersect with the carcass cords at an intersection angle θc in a tread crown region, and intersect with the carcass cords at an intersection angle θs in a pair of tread shoulder regions,
an angle of the belt cords with respect to the tire circumferential direction is in a range of 85 to 90 degrees,
the intersection angles θc and θs are in a range of 20 to 65 degrees, and
the intersection angle θc is greater than the intersection angle θs.

2. The motorcycle tire according to claim 1, wherein the band layer is disposed inwardly in the tire radial direction of the belt layer.

3. The motorcycle tire according to claim 1, wherein a width in the tire axial direction of the band layer is in a range of from 0.5 to 0.9 times of a width in the tire axial direction of the belt layer.

4. The motorcycle tire according to claim 1, wherein both ends in the tire axial direction of the belt layer are located away from a tire equator by a distance in a range of 70% to 100% of a tread development half-width.

5. The motorcycle tire according to claim 1, wherein an angle of the carcass cords with respect to the tire circumferential direction is in a range of 25 to 70 degrees.

6. The motorcycle tire according to claim 1, wherein each of the pair of tread shoulder regions has a width equal to or more than 30% of a tread development half-width from respective tread edges.

7. The motorcycle tire according to claim 1, wherein a difference (θc-θs) between the intersection angle θc and the intersection angle θs is in a range of 3 to 20 degrees.

8. The motorcycle tire according to claim 7, wherein an angle θ1a of the carcass cords at a tire equator with respect to the tire circumferential direction is in a range of 25 to 70 degrees.

9. The motorcycle tire according to claim 1, wherein an angle θ1a of the carcass cords at a tire equator with respect to the tire circumferential direction is in a range of 25 to 70 degrees.

10. A motorcycle tire comprising:
a tread portion comprising a pair of tread edges, wherein the tread portion has a radially outer surface that is curved in an arc shape manner protruding outwardly in a tire radial direction and a tread width between the pair of tread edges that extends the tire's maximum axial width;
a pair of sidewall portions; a pair of bead portions;
a toroidal carcass extending between the pair of bead portions; and
a belt layer and a band layer disposed outwardly in the tire radial direction of the carcass in the tread portion;
wherein
the carcass comprises a plurality of carcass cords that has an angle with respect to the tire circumferential direction increasing from a tire equator toward both tread edges,
the band layer comprises a jointless band ply having a band cord wound spirally at an angle equal to or less than 5 degrees with respect to a tire circumferential direction,
the belt layer comprises a plurality of belt cords arranged in a direction intersecting with the carcass cords,
the belt cords intersect with the carcass cords at an intersection angle θc in a tread crown region, and intersect with the carcass cords at an intersection angle θs in a pair of tread shoulder regions,
an angle of the belt cords with respect to the tire circumferential direction is in a range of 85 to 90 degrees,
the intersection angles θc and θs are in a range of 20 to 65 degrees, and
the intersection angle θc is greater than the intersection angle θs.

11. The motorcycle tire according to claim 10, wherein an angle of the plurality of belt cords of the belt ply with respect to the tire circumferential direction is greater than a maximum angle of the plurality of carcass cords with respect to the tire circumferential direction.

* * * * *